United States Patent [19]

New et al.

[11] 4,445,592

[45] May 1, 1984

[54] LUBRICATION SYSTEM

[75] Inventors: Nigel H. New, Harrow; John B. O'Rourke, Uxbridge, both of England

[73] Assignee: The Glacier Metal Company, Limited, Middlesex, England

[21] Appl. No.: 279,799

[22] Filed: Jul. 2, 1981

[30] Foreign Application Priority Data

Jul. 3, 1980 [GB] United Kingdom ................. 8021803

[51] Int. Cl.$^3$ ............................................. F16N 7/40
[52] U.S. Cl. .................................. 184/6.13; 184/6.22; 184/6.28; 184/27 B; 184/31; 184/96
[58] Field of Search .................. 184/6, 6.3, 6.11, 6.28, 184/12, 14, 26, 27 R, 27 B, 31, 96, 6.13; 415/76, 90

[56] References Cited

U.S. PATENT DOCUMENTS

| 256,997 | 4/1982 | Godley | 184/26 |
|---|---|---|---|
| 1,107,830 | 8/1914 | Ogden | 184/6 |
| 1,173,734 | 2/1916 | Pedersen | 184/6 |
| 2,217,329 | 10/1940 | Bentley | 184/6.28 |
| 3,104,921 | 9/1963 | Newcomer | 184/6 X |
| 3,396,664 | 8/1968 | Smith | 184/6 X |
| 3,443,663 | 5/1969 | Cox | 184/6 |
| 3,457,871 | 7/1969 | Herger | 184/26 X |
| 3,502,186 | 3/1970 | Hewitt | 184/103 |
| 3,563,344 | 2/1971 | Veller et al. | 184/6 |
| 4,350,011 | 9/1982 | Rögner et al. | 415/90 X |

Primary Examiner—David H. Brown
Assistant Examiner—John E. Griffiths, Jr.
Attorney, Agent, or Firm—Oblon, Fisher, Spivak, McClelland & Maier

[57] ABSTRACT

A lubrication system for a thrust and/or journal bearing for a shaft. The system comprises a viscosity pump mounted on the shaft within the thrust bearing housing, a main lubricant reservoir and a closed auxiliary reservoir. The pump inlet is connected to the auxiliary reservoir below the level at which the main reservoir is in communication with the auxiliary reservoir, the latter level being the desired level of lubricant in the housing. The pump outlet is arranged to supply lubricant to the bearings.

11 Claims, 3 Drawing Figures

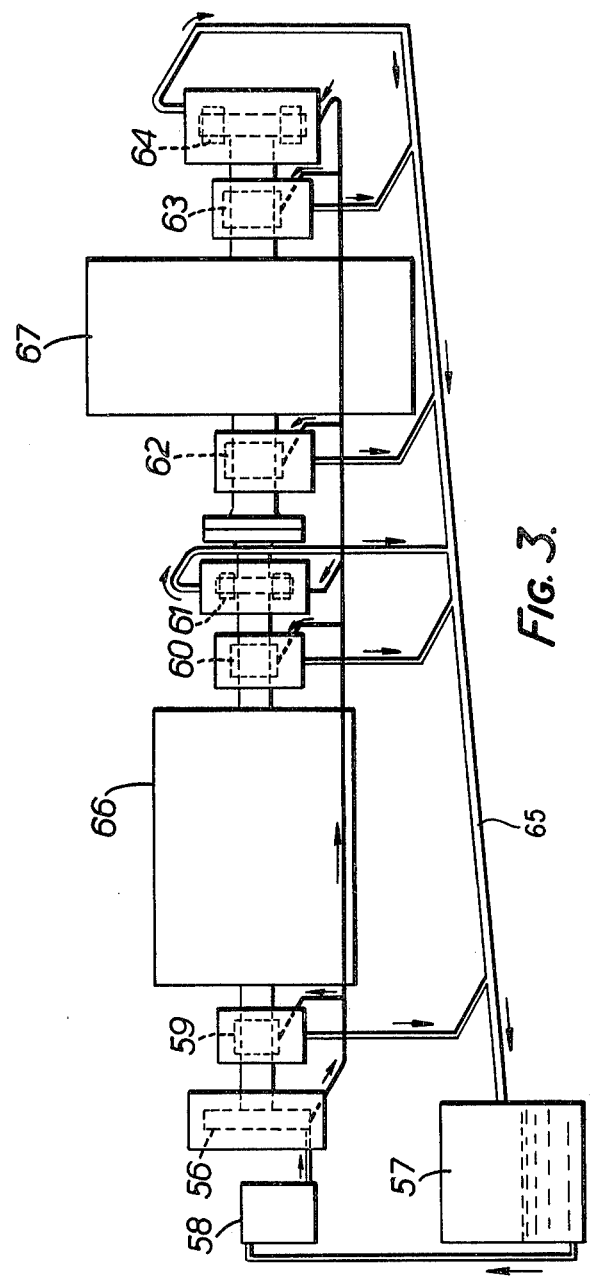

LUBRICATION SYSTEM

The present invention relates to a lubrication system for one or more journal and/or thrust bearings for a shaft.

In a previously used lubrication system a pump for pumping lubricant to the bearings has its inlet connected to an oil sump at a level below that of the pump.

To ensure that the pump will prime and commence, to deliver oil as soon as shaft rotation commences it is necessary for the lowest part of the pump rotor to be immersed in oil, and it is preferable that the oil be maintained at a higher level to avoid the risk of inadequate lubrication to the bearings.

During periods when the machine is stationary, the oil drains slowly back to the sump through the working clearances in the pump. Thus if the high oil level is to be maintained, it follows that the oil level in the sump must be at this level or higher. However, if the oil level in the sump is above the level of the bottom of the shaft, leakage tends to occur at the point where the shaft enters the bearing casing. The maximum level will therefore be determined by the largest shaft diameter.

Moreover, in the case where oil is pumped to a remote bearing casing, to ensure that oil flows back to the main sump through a return pipe, a hydraulic gradient is necessary to overcome pipe friction, and therefore the level in the main sump must be lower than the level in the sump at the remote bearing. In practice this places restrictions on the length of the return pipe and usually requires a large diameter pipe to minimize the friction, resulting in clumsy and inconvenient pipework.

It will be appreciated that there is a mutual incompatability since these requirements oppose each other, and a compromise must be reached with the result that the level of oil in the main sump tends to be very critical. There is very little latitude in the level, and vigilance is necessary on the part of the machine attendant to see that the level does not fall below the critical point.

It is possible to overcome this problem by arranging for manual priming of the thrust compartment, but this requires the presence of an attendant at every start-up, and this technique is therefore subject to failure by human error. Moreover, it precludes automatic starting of the machine unless a good deal of complication is incurred.

It is an object of the present invention to overcome these disadvantages.

According to the present invention, a lubrication system for supplying a liquid lubricant to one or more journal and/or thrust bearings comprises a pump located within a casing, a main lubricant reservoir and a closed auxiliary lubricant reservoir, in which the pump inlet is connected to the auxiliary reservoir at a first level, the main reservoir is in communication with the auxiliary reservoir at a second level, the second level being above the first, and in which the pump outlet is arranged to supply the lubricant to the one or more bearings.

Preferably, the pump is a viscosity pump whose rotor is driven by the shaft whose bearings are to be lubricated, though the pump may be a centrifugal pump, or any other suitable type.

Preferably the casing is in communication with the auxiliary reservoir via a flow restricting conduit at a level above the first level.

The lubricant filler for the system may be in the form of a U-tube, or any equivalent construction, having its opening above the level of the auxiliary reservoir in order to ensure that no air enters the system with the lubricant during filling.

Preferably the pump is located within a bearing casing.

Preferably the system includes a conduit connecting the top of the pump casing to the main reservoir at a level above the proposed lubricant level, the conduit including a sight glass.

The auxiliary reservoir may be located inside or outside the casing in which the pump is housed. The various connections and conduits may be in the form of pipes or may be passages within the components.

The invention may be carried into practice in various ways. Some embodiments will now be described by way of example with reference to the accompanying drawings, in which:

FIG. 3 is a schematic diagram of a lubrication system in accordance with the invention in use with two machines.

Figure 2:
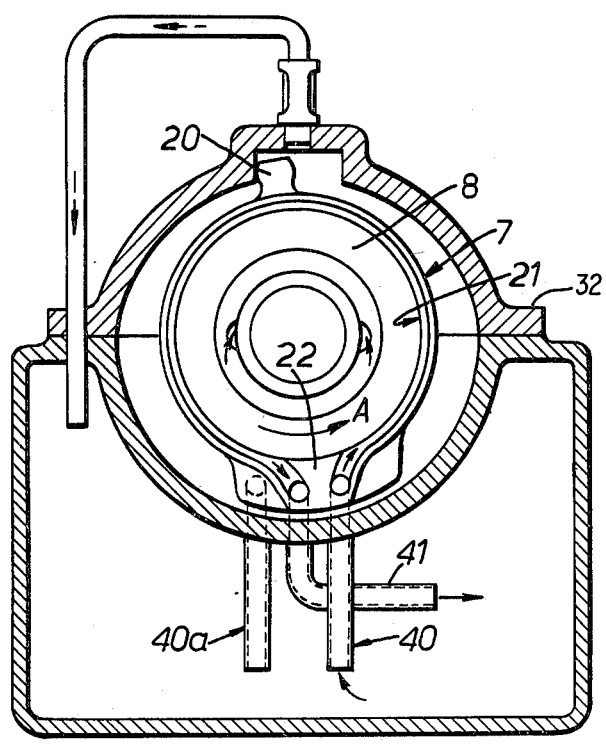
FIG. 2 is a schematic vertical section through the viscosity pump used in the embodiments of FIG. 1.

Referring first to FIG. 2, a viscosity pump 7 is freely supported on a thrust collar 8 and is a close fit between the faces of a casing 32. It is prevented from rotating by a stop 20, but is free to swing by a limited angle so as to change its suction port from 40, as shown in FIG. 2 for the direction of rotation shown by the arrow A, to 40a if the direction of rotation is reversed. When the collar 8 rotates, and by virtue of the viscosity of the oil, flow is created and a discharge pressure generated by drawing oil through the suction passage 40. The oil is carried around an annular groove 21 until it reaches a barrier 22, after which the oil is discharged via a discharge port 41. From there the oil passes into a thrust compartment.

Figure 1:
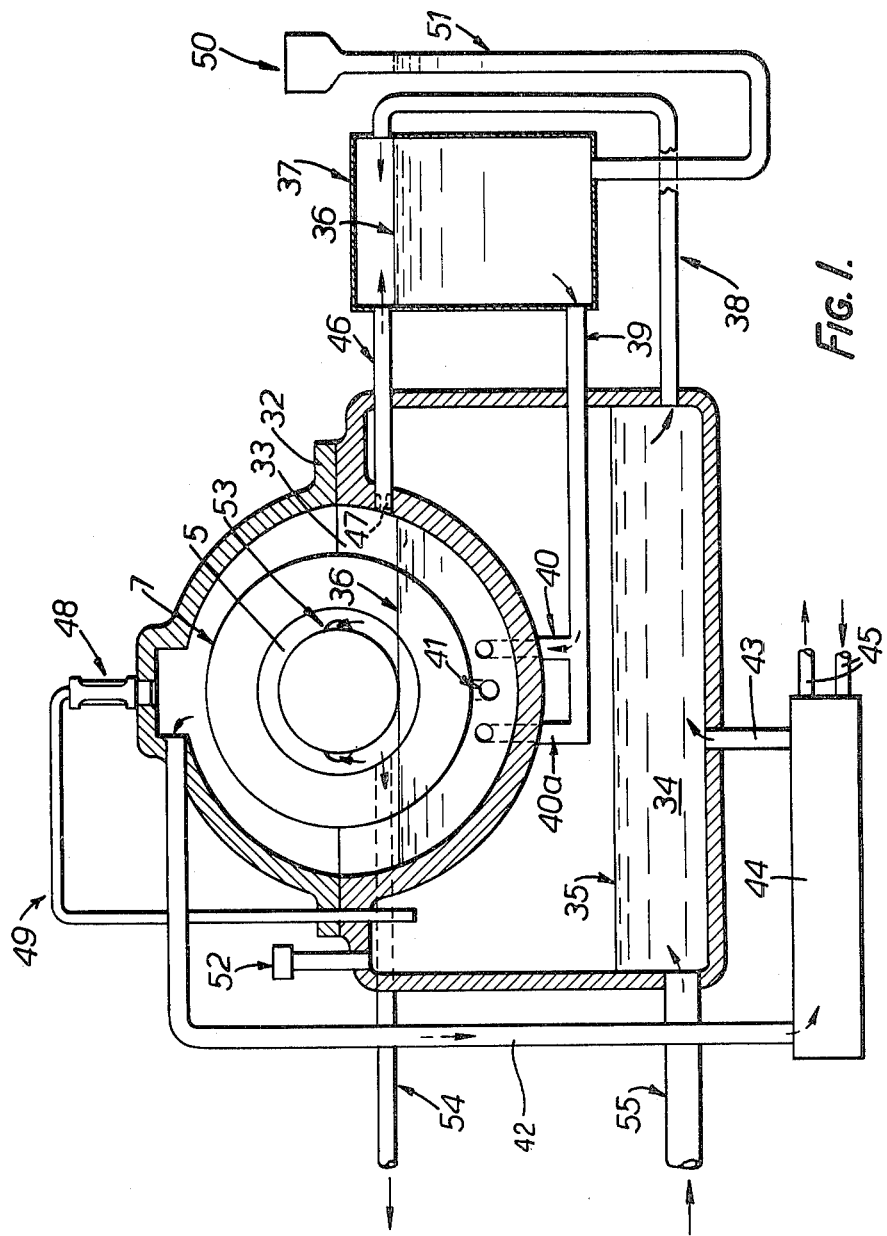
FIG. 1 is a schematic vertical section in accordance with the invention.

Referring now to FIG. 1, the casing 32 contains thust bearings, a journal bearing 5, the viscosity pump 7, a main sump 34, and a thrust compartment 33. A pipe 38 leads from below the oil level 35 in the main sump 34 to a closed auxiliary or priming reservoir 37, the pipe terminating near the top of this reservoir. From the bottom of the auxiliary reservoir 37 a suction pipe 39 leads to the pump suction port 40 or 40a according to the direction of rotation of the shaft.

The pump discharge port 41 communicates only with the thrust compartment 33.

The minimum standing oil level 36 in the thrust compartment 33 and the auxiliary reservoir 37 is at the level of the bottom of the shaft in the journal bearing 5. All other connections to the thrust compartment 33 are above level 36.

In operation, oil from the pump flows into the thrust compartment 33 through a port 41 and leaves by a pipe 42 to a cooler 44 and thence through a pipe 43 back to the main sump 34. At the top of the thrust compartment 33 there is a sight glass 48 leading to a pipe 49 fitted with a restriction orifice, connected to the air space in the main sump compartment, which is vented to atmosphere by an air vent 52.

From the thrust compartment 33 above the level 36, a pipe 46 fitted with restriction orifice 47 is connected to the top of the auxiliary reservoir 37. An oil filler 50 is connected by a U-tube 51 to the auxiliary reservoir 37.

The journal bearing 5 receives oil from the thrust compartment 33 via axial grooves 53.

From the thrust compartment 33, above the level 36 a connection is taken to a pipe 54 which supplies oil under pressure to a remote journal bearing. From this bearng the oil returns by a pipe 55 to the main sump 34.

Prior to starting up the machine, the bearing system is filled with oil through the filler 50. From this the oil flows through the U-tube 51 into the auxiliary reservoir 37 and thence through the pipe 39 into the pump suction port 40 or 40a. At the suction port the oil percolates through the pump clearances into the thrust compartment 33. As filling continues and when the auxiliary reservoir 37 is filled, the oil flows through the pipe 46, also filling the thrust compartment 33 to a level somewhat above the level 36. At this point oil overflows and passes into the top of the pipe 38, through this pipe to fill the main sump 34 and passes down the pipe 55 until this pipe is also filled. Oil filling continues until the main sump oil level reaches the required gauge level 35.

During the filling process air is vented firstly from the auxiliary reservoir 37 into the thrust compartment 33 and then, as the latter fills, also through the sight glass 48 and the pipe 49 and through the sump air vent 52. At this stage, the main sump 34 is filled to the level 35 and the thrust compartment 33 and auxiliary reservoir 37 both to the level 36 or slightly higher, ensuring that the pump is fully primed.

On starting up the machine and as soon as rotation commences, the pump 7 draws oil from the auxiliary reservoir 37 through the pipe 39 and the suction port 40 or 40a (according to direction of rotation). The pump 7 discharges oil through the discharge port 41 into the thrust compartment 33, until this is filled. As soon as the orifice 47 is drowned by oil, a suction is created in the auxiliary reservoir 37, and oil is then drawn from the main sump 34 via the pipe 38. The thrust compartment 33 fills with oil rapidly, and the air being displaced by the rising oil level flows through the sight glass 48 and the vent pipe 49. Oil enters the journal bearing 5 through grooves 53 and also flows through the pipe 54 to supply the remote journal bearing. Passing through this bearing the oil returns in the pipe 55 to the main sump 34. When all air has been displaced from the thrust compartment 33, the sight glass 48 will be seen to be full of oil, indicating that the system is operating correctly. The total time from start up to this point is very short and is measured in seconds.

Should it be necessary to top up the system whilst running, it is only necessary to add oil through the filler 50. The U-tube 51 ensures that air is not drawn into the auxiliary reservoir 37 by the suction.

When the machine comes to rest, pumping ceases, and the oil in the thrust compartment 33 will drain down through the orifice 47 and the pipe 46 into the auxiliary reservoir 37, overflowing down the pipe 38 and into the main sump 34. As this proceeds, air is drawn in through the pipe 49. When the oil level has fallen to the level of the orifice 47 air enters this and through the pipe 46 to break the vacuum in the auxiliary reservoir 37 so that this remains full up to the level 36. The level cannot fall below this point either in the thrust compartment or the auxiliary reservoir.

It will be appreciated that at all times the lower part of the thrust bearing is submerged in oil and the pump suction is also submerged which ensures immediate priming. Moreover, the oil level 35 in the main sump 34 can be arranged at any reasonable desirable level to suit the size of the remote journal bearing and the hydraulic gradient in the return pipe. It is thus possible to use a smaller size of return pipe. The available distance from the shaft centreline down to the level 35 is limited only by the suction capacity of the pump and should therefore be adequate for all practical purposes.

In FIG. 3, the invention is shown schematically but in practice, the auxiliary reservoir 37 is located within the main casing 32 for convenience and compactness.

The invention may be applied to any arrangement of one or more thrust bearings and/or journal bearings, combined in any convenient manner and with the pump combined with any bearing or placed in a separate casing whichever is desirable. One such possible arrangement is shown in FIG. 3 where two machines 66 and 67 are coupled together and use a common lubrication system, a pump 56 drawing from a main sump 57 through an auxiliary priming reservoir 58 and delivering oil to bearings 59, 60, 61, 62, 63 and 64, the oil returning through a common drain 65 to the main sump 57.

What we claim as our invention and desire to secure by Letters Patent is:

1. A lubrication system for supplying a liquid lubricant to at least one bearing, said system comprising:
   (a) a casing;
   (b) a thrust collar located within said casing;
   (c) a viscosity pump freely supported on said thrust collar and having an inlet and an outlet;
   (d) a main sump which serves as a main lubricant reservoir; and
   (e) a closed auxiliary reservoir which serves as a priming reservoir for said viscosity pump,
   wherein:
   (f) the outlet of said pump is arranged to supply lubricant to said at least one bearing;
   (g) the inlet of said pump is connected to said closed auxiliary reservoir at a first level;
   (h) said closed auxiliary reservoir is in communication with said casing at a second level such that the level of the lubricant in said closed auxiliary reservoir and the level of the lubricant in said casing are the same when said viscosity pump is not in operation, said level of the lubricant being such that a substantial portion of said thrust collar is immersed in the lubricant;
   (i) said main sump is in communication with said closed auxiliary reservoir at a level at or above said second level;
   (j) said main sump is in communication with said casing at a level above said second level; and
   (k) the free surface of the lubricant in said main sump is at a third level which is below said second level.

2. A lubrication system as recited in claim 1 wherein:
   (a) said at least one bearing is associated with a shaft and
   (b) said thrust collar is driven by said shaft.

3. A lubrication system as recited in claim 1 wherein said closed auxiliary reservoir is in communication with said casing by way of a flow restricting conduit.

4. A lubrication system as recited in claim 1 and further comprising a lubricant filler in the form of a U-tube having its opening above said second level.

5. A lubrication system as recited in claim 1 wherein said main sump is in communication with said casing by way of a conduit connecting the top of said casing to said main sump, said conduit including a sight glass.

6. A lubrication system as recited in claim 1 wherein said main sump is vented to the atmosphere.

7. A lubricant system for supplying a liquid lubricant to at least one bearing, said system comprising:
(a) a casing;
(b) a thrust collar located within said casing;
(c) a viscosity pump freely supported on said thrust collar and having an inlet and an outlet;
(d) a main sump which serves as a main lubricant reservoir; and
(e) a closed auxiliary reservoir which serves as a priming reservoir for said viscosity pump,
wherein:
(f) the outlet of said pump is arranged to supply lubricant to said at least one bearing;
(g) the inlet of said pump is connected to said closed auxiliary reservoir at a first level;
(h) said closed auxiliary reservoir is in communication with said casing at a second level such that the lvel of the lubricant in said closed auxiliary reservoir and the level of the lubricant in said casing are the same when said viscosity pump is not in operation, said level of the lubricant being such that a substantial portion of said thrust collar is immersed in the lubricant;
(i) said main sump is in communication with said closed auxiliary reservoir at a level at or above said second level;
(j) said main sump is in communication with said casing at a level above said second level; and
(k) said closed auxiliary reservoir is in communication with said casing by way of a flow restricting conduit.

8. A lubrication system as recited in claim 7 wherein:
(a) said at last one bearing is associated with the shaft and
(b) said thrust collar is driven by said shaft.

9. A lubrication system as recited in claim 7 and further comprising a lubricant filler in the form of a U-tube having its opening above said second level.

10. A lubrication system as recited in claim 7 wherein said main sump is in communication with said casing by way of a conduit connecting the top of said casing to said main sump, said conduit including a sight glass.

11. A lubrication system as recited in claim 7 wherein said main sump is vented to the atmosphere.

* * * * *